United States Patent [19]

Kardash

[11] Patent Number: 5,691,856
[45] Date of Patent: Nov. 25, 1997

[54] APPARATUS AND METHOD FOR PROVIDING SELECTIVE HYSTERESIS FOR ZERO CROSSINGS OF A DISK DRIVE SPINDLE MOTOR

[75] Inventor: John J. Kardash, Gilroy, Calif.

[73] Assignee: Quantum Corporation, Milpitas, Calif.

[21] Appl. No.: 541,845

[22] Filed: Oct. 10, 1995

[51] Int. Cl.$^6$ .................................................. G11B 15/46
[52] U.S. Cl. .................................. 360/73.03; 360/97.01; 360/73.01
[58] Field of Search ........................... 360/73.03, 78.13, 360/75, 73.01; 318/653, 324, 439, 254, 807, 809

[56] References Cited

U.S. PATENT DOCUMENTS

| | | | |
|---|---|---|---|
| 4,743,815 | 5/1988 | Gee et al. | 318/254 |
| 4,864,198 | 9/1989 | Takase et al. | 318/254 |
| 4,922,169 | 5/1990 | Freeman | 360/73.03 X |
| 5,210,474 | 5/1993 | Oswald | 318/254 |
| 5,367,234 | 11/1994 | DiTucci | 318/254 |
| 5,397,971 | 3/1995 | McAllister et al. | 318/254 |
| 5,442,266 | 8/1995 | Morehouse et al. | 360/73.03 X |
| 5,493,189 | 2/1996 | Ling et al. | 318/254 |
| 5,541,484 | 7/1996 | DiTucci | 318/254 |

OTHER PUBLICATIONS

U.S. application No. 08/094,484, Galvin et al., filed Jul. 19, 1993.

*Primary Examiner*—Aristotelis M. Psitos
*Assistant Examiner*—Kin Wong
*Attorney, Agent, or Firm*—David B. Harrison; Debra A. Chun

[57] ABSTRACT

A hysteresis circuit for providing hysteresis for a degree of noise immunity when detecting zero-crossings of a hard disk drive. A comparator is used to detect the zero-crossings associated with one of the windings of the disk drive's spindle motor. When a zero-crossing is detected, the hysteresis circuit introduces a hysteresis voltage to one of the inputs to the comparator. A positive hysteresis voltage is applied when the slope of the back emf signal corresponding to the motor winding is negative. Conversely, a negative hysteresis voltage is applied when the back emf signal has a positive slope. The slope of the back emf signal is determined by a logic combination of the commutation signals used to commutate the spindle motor.

15 Claims, 4 Drawing Sheets

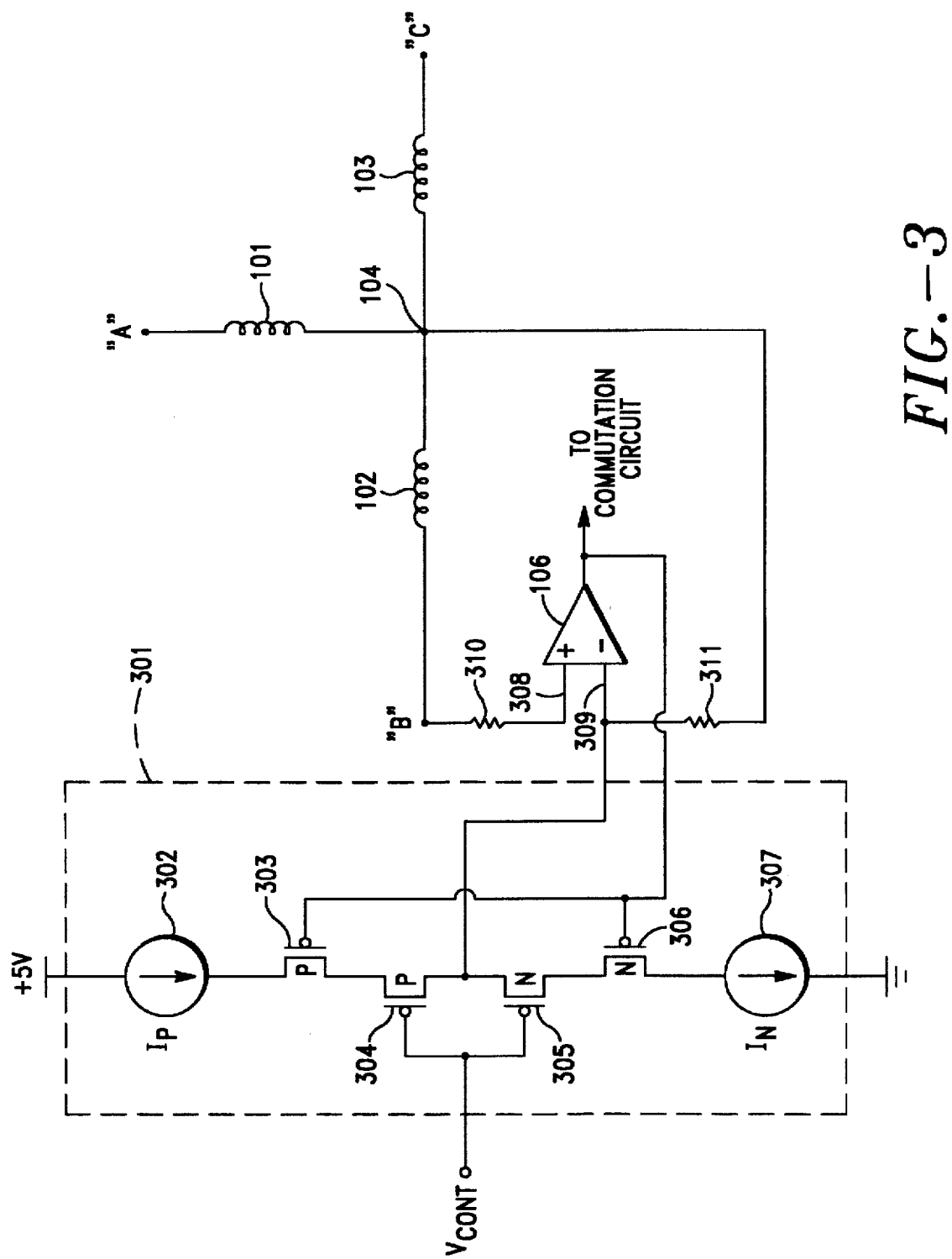
FIG.−3

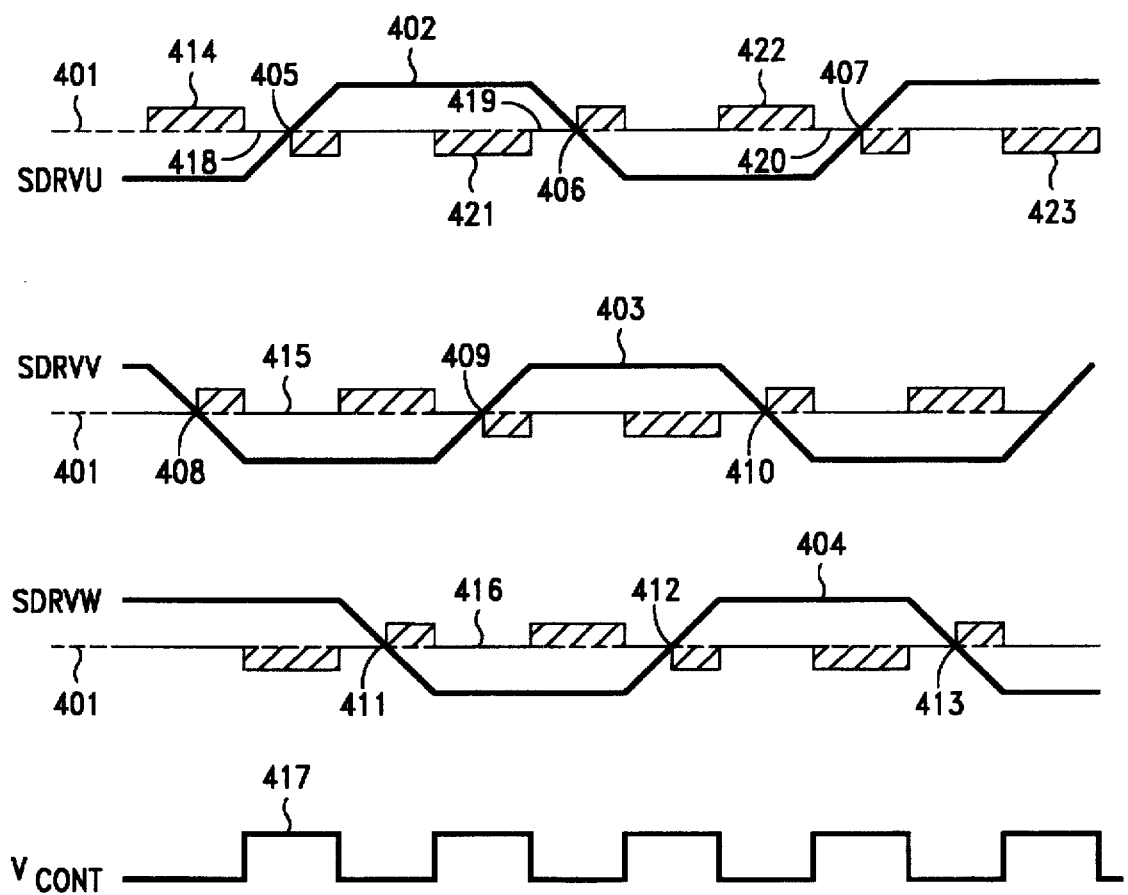
FIG.—4

APPARATUS AND METHOD FOR PROVIDING SELECTIVE HYSTERESIS FOR ZERO CROSSINGS OF A DISK DRIVE SPINDLE MOTOR

TECHNICAL FIELD

The present invention pertains to the field of hysteresis circuits. More specifically, the present invention relates to a circuit for providing selective hysteresis to minimize the impact of noise in the detection of the zero crossings associated with disk drive spindle motors.

BACKGROUND ART

One of the most common devices used to store data for virtually every computer system ranging from mainframes to laptops is the hard disk drive. Basically, in a hard disk drive, the data is stored as a series of digital bits onto one or more rigid disks. These disks are rotated about a spindle by a spindle motor. A transducer or "head" is used to magnetically record the data onto these spinning disks. As the transducer is moved radially by a servo/actuator assembly across the surface of a spinning disk, a number of circular "tracks" are defined. The digital bits of data are written onto these tracks.

The goal of all disk drive manufacturers is to store more bits of data within a given storage area and to access (i.e., read/write) the data more quickly. Today's hard disk drives typically have areal densities where each bit of data is microns in width and seek times are in the order of milliseconds. Working within these extremely tight dimensions, it is critical that the spindle motor spins the disks at a high speed and maintains it at a constant rate. Otherwise, unless the disks are kept at a uniform speed, the data would be written unevenly. An uneven data recordation is inefficient and wasteful of disk space. Furthermore, a non-uniform spindle rate makes it a more difficult task to read and process the data. Not only would seek times increase, but it might even result in erroneous data retrieval. Hence, most hard disk drive manufacturers strive to keep the disks spinning within a 0.01% tolerance.

One method for keeping the spindle motor spinning at a constant rate is to control the times at which the spindle motor is commutated. Commutations relate to how current is sent through the three spindle motor windings. According to physics, a current flowing through a magnetic field produces torque, which causes the shaft to turn. The shaft is kept spinning by commutating between the different spindle motor windings.

In order to know when the commutations are to occur, one needs to know the physical position of the windings. One prior art method for determining physical position involves implementing one or more "Hall effect" sensors. However, this approach requires additional sensors and circuits and can be quite expensive. A different, sensorless approach involves monitoring the "zero-crossings" corresponding to "back emf". It is known that the rotation of a winding through a magnetic field produces an electromotive force (i.e., the "back emf"). By monitoring when the back emf crosses a zero volt reference point with respect to the center-tap (i.e., the "zero-crossings"), one can accurately determine the spindle motor's physical position.

Once the physical locations have been established, it is a rather simple procedure to determine when to commutate the motor. Typically, the spindle motor is commutated at the mid-point in-between each zero-crossing pair. Hence, accurately determining the occurrence of zero-crossings is vital in determining when the windings are to be commutated in order to keep the spindle motor revolving at a constant rate.

However, one common problem experienced with the above-mentioned approach is due to noise. Noise inherent to the system can falsely trigger the detection of a zero-crossing. This, in turn, causes the spindle motor to erroneously commutate. Moreover, this approach is especially susceptible to noise that occurs near the zero-crossings because noise can easily cause the signal to cross back across the reference voltage. Even small amounts of noise can result in false zero-crossings.

Furthermore, the comparators used to detect the zero-crossings are designed to have very small offsets (e.g., a few millivolts) in order to more accurately pinpoint zero-crossings. However, in implementing such small offsets, these comparators are prone to oscillate due to noise present at their inputs. In an effort to provide a degree of noise immunity, some designers have incorporated hysteresis to the inputs of the comparator. This hysteresis provides a margin of voltage that the input signals must exceed before the comparator is allowed to retrigger. In other words, noise below this certain margin of voltage will not cause the comparator to falsely trigger. The problem with implementing such a hysteresis scheme is that the hysteresis produces a large offset in the comparator, which leads to inaccuracies.

Hence, there is a need in the prior art for a hysteresis circuit that minimizes the number of false zero-crossings attributable to noise and that does not produce a large offset. It would be preferable if such a circuit were inexpensive to implement and works for both positive as well as negative back emf.

DISCLOSURE OF THE INVENTION

The present invention pertains to a hysteresis circuit that is used in a hard disk drive for selectively applying hysteresis to a zero-crossing comparator in order to provide a degree of noise immunity. The comparator is used to detect the zero-crossings associated with one of the windings of the disk drive's spindle motor. When the back emf signal of that winding equals the center-tap voltage, the comparator output switches states to indicate that a zero-crossing has just been detected. When this occurs, the hysteresis circuit introduces a hysteresis voltage to one of the inputs to the comparator. A control signal directs the hysteresis circuit to apply a positive hysteresis voltage when the slope of the back emf signal corresponding to the motor winding is negative. Conversely, the control signal directs the hysteresis circuit to apply a negative hysteresis voltage when the back emf signal has a positive slope. The control signal is generated by logically combining commutation signals that are used to commutate the spindle motor.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a schematic diagram of the currently preferred embodiment of the hysteresis circuit of the present invention.

FIG. 4 shows the respective waveforms of signals corresponding to the center-tap, three spindle motor drivers, hysteresis voltages, and control signal.

BEST MODE FOR CARRYING OUT THE INVENTION

A circuit for providing selective hysteresis in order to minimize the impact of noise in identifying the true zero crossings of a disk drive spindle motor is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid unnecessarily obscuring the present invention.

Figure 1:
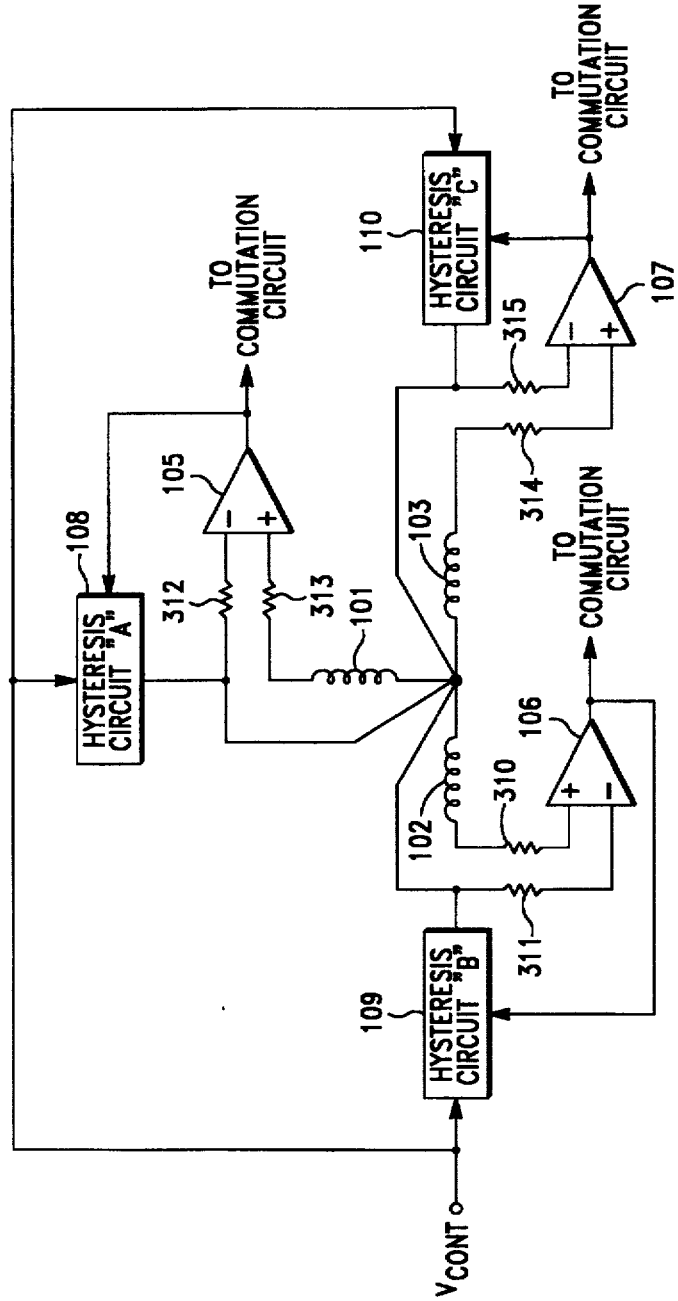
FIG. 1 shows a block diagram of how hysteresis circuits are used to provide selective hysteresis in order to prevent noise pulses from falsely triggering zero-crossing detections.

FIG. 1 shows a block diagram of how hysteresis circuits are used to provide selective hysteresis in order to prevent noise pulses from falsely triggering zero-crossing detections. The three coils 101–103 represent the three windings of a spindle motor. These three coils are coupled to a center-tap 104. Three comparators 105–107 are used to detect when the back emf associated with their respective coils 101–103 cross the reference voltage of center-tap 104. A hysteresis circuit is coupled to each of the three coil/ comparator combinations via resistor 311, 312 and 315. For example, hysteresis circuit "A" 108 is coupled to comparator 105 and coil 101 via resistor 313; hysteresis circuit "B" 109 is coupled to comparator 106 and coil 102 via resistor 310; and hysteresis circuit "C" is coupled to comparator 107 and coil 103 via resistor 314. These hysteresis circuits 108–110 provide hysteresis to the comparators 105–107 selectively, such that the true trigger point is not affected by the hysteresis that is introduced. This is accomplished by activating hysteresis only after one of the respective comparators 105–107 has been triggered. The hysteresis is activated at that point to prevent subsequent noise from falsely triggering that comparator. This scheme applies to both the positive as well as negative slopes associated with a signal. It should be noted that the present invention does not require the use of elaborate circuits or sensors to determine the slopes of a signal in order to determine when to apply hysteresis. The outputs of comparators 105–107 are connected to a commutation circuit which is coupled to control logic (see FIG. 5) that generates control signal $V_{CONT}$, which is discussed in greater detail hereinafter.

Figure 2:
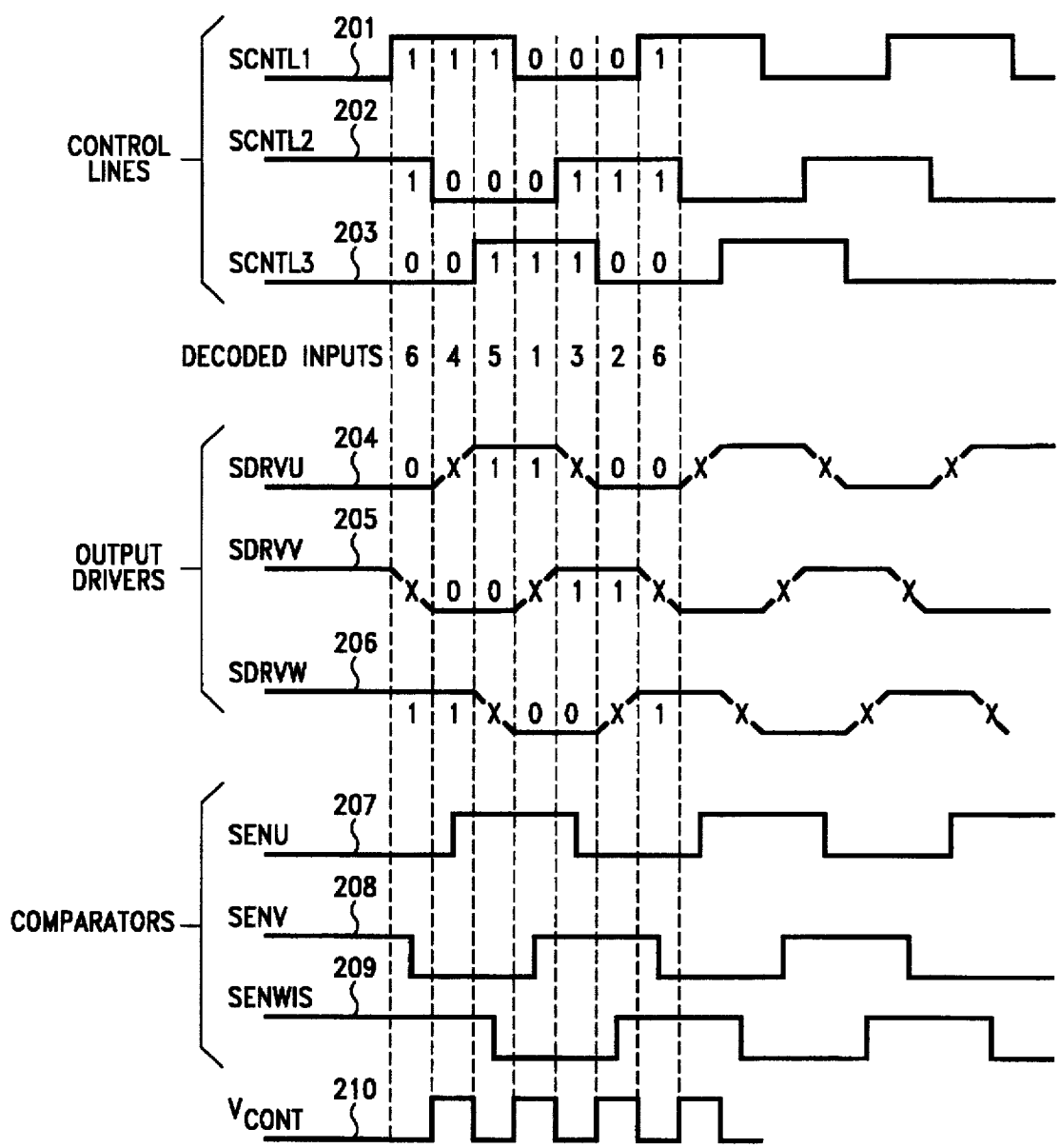
FIG. 2 is a timing diagram showing the various control, output driver, and comparator output signals corresponding to the different spindle motor commutation sequences.

FIG. 2 is a timing diagram showing the various control, output driver, and comparator output signals corresponding to the different spindle motor commutation sequences. The top three signals 201–203 represent the spindle control signals. The following input signal "6, 4, 5, 1, 3, and 2" representing the six different commutation states are decoded to give the waveforms shown as 201–203. This "6, 4, 5, 1, 3, and 2" signal pattern is repeated over and over again to keep the spindle motor spinning. The next three signals 204–206 correspond to the output signals of the three spindle drivers. Each winding has its own driver for providing the appropriate amount of current to flow through that particular winding. The bottom three signals 207–209 show the waveforms of the signals output from the three comparators. It can be seen that a transition (i.e., a rising or falling edge) in the output of a comparator corresponds to a change in state of the corresponding output driver. The zero-crossings are represented by the "x's" of the output drivers signals 204–206. Also shown is the control signal 210.

FIG. 3 is a schematic diagram of the currently preferred embodiment of the hysteresis circuit of the present invention. The spindle motor actually has three hysteresis circuits, each of which is the same as the hysteresis circuit shown as 301. For the sake of clarity, only one of these hysteresis circuits is shown in FIG. 3 and discussed below. Hysteresis circuit 301 corresponds to the "B" motor winding 102 and is coupled to the zero-crossing comparator 106 associated with the "B" motor winding 102. Similarly, the other two hysteresis circuits are coupled to the zero-crossing comparators (not shown) corresponding to the "A" motor winding 101 and to the "C" motor winding 103. Each of these three zero-crossing comparators has its positive input coupled to its respective motor winding, and its negative input is coupled to the center-tap 104 of all three windings 101–103. For example, the positive input of zero-crossing comparator 106 is coupled to motor winding 102 via resistor 310. The negative input of zero-crossing comparator 106 is coupled to center-tap 104 via resistor 311.

As the spindle motor rotates, each of the windings 101–103 will be released from the motor drivers. The "freed" winding senses the back emf of the motor. The zero-crossing comparator corresponding to the freed winding senses the voltage across the freed winding and switches its output signal (i.e., a "high" signal goes "low" and vice versa) when the positive input signal is equal to the center-tap voltage (e.g., 2.5 volts). Referring to FIG. 3, hysteresis circuit 301 is used to provide hysteresis to comparator 106. As described above, comparator 106 is used to determining the zero-crossings of motor winding 102. The accuracy of determining the two signals on input lines 301 and 302 to comparator 106 are vital for performing commutations on sensorless spindle motors. Comparator 106 fires when the two input signals are matched. Hysteresis is introduced by circuit 301 once the comparator 106 actually fires. A control signal "$V_{CONT}$" is input to hysteresis circuit 301 to specify the time to change the polarity of the hysteresis. This control signal, $V_{CONT}$, detects when positive slopes will occur on the output driver corresponding to motor winding 102. This information is used to provide comparator 106 with negative hysteresis on positive slopes and positive hysteresis on negative slopes.

The actual hysteresis circuit 301 is comprised of current source 302, p-channel transistors 303 and 304, n-channel transistors 305 and 306, and current sink 307. A hysteresis voltage is produced by either current Ip from current source 302 or current $I_N$ from current sink 307 flowing through resistor 311. The amount of hysteresis is equal to VH=($I_p$ or $I_N$)×R311, where VH is the hysteresis voltage, $I_p$ is the amount of current from current source 302, $I_N$ is the amount of current from current sink 307, and R311 is the resistance of resistor 311. In the currently preferred embodiment, approximately 10 millivolts to 50 millivolts of hysteresis is provided. Any number of different amount of current ($I_p$ and $I_N$) and resistance (R311) value combinations may be used to effect the desired hysteresis magnitude. For example, 10 millivolts of hysteresis can be achieved by setting the $I_p$ and $I_N$ currents to 100 microamps and the resistance of resistor 311 to 500 ohms.

There are two possible conditions under which the spindle motor coil 102 operates. The voltage of motor coil 102 can start from 0 volts and swing positive (i.e., the voltage increases). In other words, the voltage has a positive slope.

Alternatively, the voltage of motor coil 102 can swing negative (i.e., the voltage decreases), which means that the voltage has a negative slope. Hysteresis circuit 301 provides hysteresis for both of these conditions. Taking the first case of an increasing voltage across motor winding 102, $V_{CONT}$ is set high (the way that the $V_{CONT}$ signal is generated will be described in detail below). A high $V_{CONT}$ signal causes the p-channel transistor 304 to turn off and the n-channel transistor 305 to turn on. Given that an output of the zero-crossing comparator 106 is low, this causes the n-channel transistor 306 to be turned off (i.e., non-conducting). Because n-channel transistor 306 is turned off, no current is conducted through resistor 311. As a result, there is no hysteresis that is provided during those times wherein the voltage across motor winding 102 is less than the center-tap 104 voltage. In other words, the hysteresis is disabled. However, when the voltage across motor winding 102 becomes equal to the center-tap 104 voltage, the output signal from zero-crossing comparator 106 switches from low to high (i.e., 0 volts to +5 volts). This, in turn, causes the n-channel transistor 306 to turn on. Thereby, the current source 302 sinks current $I_N$ to flow through resistor 311. This sink current $I_N$ flowing through resistor 311 produces a negative hysteresis voltage of VH. The negative hysteresis voltage VH is applied to the negative input of zero-crossing comparator 106. Essentially, the hysteresis voltage VH acts as an offset which stabilizes zero-crossing comparator 106 to set high. Hence, any noise falling below the hysteresis voltage VH does not falsely trigger zero-crossing comparator 106. Only those noise pulses that exceed the hysteresis voltage VH will false retrigger the zero-crossing comparator 106.

In the second case, where the voltage across motor winding 102 swings negative (i.e., from a high voltage to a lower voltage), the $V_{CONT}$ signal is set low. A low $V_{CONT}$ signal turns on p-channel transistor 304 and turns off n-channel transistor 305. With n-channel transistor 305 turned off, the current path from current sink 307 is cut off from resistor 311. Thereby, there is no hysteresis being applied to zero-crossing comparator 106 as the voltage across motor winding 102 goes negative. As the voltage across motor winding 102 eventually crosses and equals the center-tap 104 voltage, the output signal from zero-crossing detector 106 switches from a high level (i.e., +5 volts) to a low level (i.e., 0 volts). A low output from zero-crossing detector 106 causes p-channel transistor 303 to turn on (i.e., conducting). This allows the source current $I_p$ to flow through resistor 311. The $I_p$ current flowing through resistor 311 produces a positive hysteresis voltage VH that is applied to the negative input of zero-crossing detector 106. Hence, this positive hysteresis provides a noise immunity of VH to the zero-crossing comparator 106.

In summary, zero-crossing comparator 106 switches when the voltage across motor winding 102 is equal to the voltage of center-tap 104. This is true, irrespective of whether the input signal to the zero-crossing comparator 106 swings positive or negative. After the zero-crossing comparator 106 switches its output signal, the hysteresis circuit 301 applies a hysteresis voltage VH to the negative input of zero-crossing comparator 106. The polarity of the hysteresis voltage VH is made such that a negative hysteresis is provided for a rising back emf, and a positive hysteresis is provided for falling back emf. As a result, hysteresis is provided for both rising and falling signals.

FIG. 4 shows the respective waveforms of signals corresponding to the center-tap, three spindle motor drivers, hysteresis voltages, and control signal. It can be seen that the center-tap signal 401 remains at a constant reference voltage (e.g., 2.5 volts). The center-tap signal 401 is represented as horizontal dashed lines. The three signals (e.g., SDRVU, SDRVV, and SDRVW) used to drive the three spindle motor windings are shown as 402-404. These signals 402-404 transition from 0 volts to +5 volts and then back down to 0 volts. Note that zero-crossings 405-413 occur whenever the center-tap signal 401 intersects any of the signals 402-404.

The hysteresis voltages that are applied to the negative input terminals of the comparators are shown as waveforms 414-416. In other words, signal 414 is applied to the negative input terminal of the first comparator; signal 415 is applied to the negative input terminal of the second comparator; and signal 416 is applied to the negative input terminal of the third comparator. The amount of hysteresis is represented by the shaded regions. It can be seen that negative amounts of hysteresis are provided for positive signals (relative to the center-tap signal 401) while positive amounts of hysteresis are provided for negative signals (relative to the center-tap signal 401). Note that just prior to a zero-crossing, no hysteresis is applied (see the areas 418-420). The hysteresis is turned off in order to detect the true zero-crossings. It should also be pointed out that, due to the nature of the control signal 417, hysteresis is caused to occur in the middle of a cycle (see, for example, hystereses 421-423 corresponding to the SDRVU signal 402). These hystereses are superfluous and serve no function. The control signal $V_{CONT}$ 417 is initially shown as being in a low state (i.e., 0 volts). However, control signal 417 switches to a high state (i.e., +5 volts) when signal 402 starts to rise. The control signal 417 stays at this high state until signal 402 stops rising, at which point, the control signal 417 switches to a low state. It can be seen that the control signal 417 alternates between the high and low states in order to control all three of the hysteresis circuits. Only the particular hysteresis circuit corresponding to a back emf signal that is either rising or falling is influenced by the control signal. The other back emf signals are stable and are either higher or lower than the center-tap voltage, and thus, their corresponding hysteresis circuits cannot be influenced by the control signal 417.

The following paragraph now describes in detail how the control signal $V_{CONT}$ is generated. The control signal $V_{CONT}$ is generated as a function of the three commutation signals. These three commutation signals are used in driving the three motor coils. Thereby, these three commutation signals can also be used to predict when the positive and negative slopes of a particular motor coil is to occur. Based on this observation, logic is implemented to decode the commutation signals to determine when a particular motor coil is rising or falling.

Figure 5:
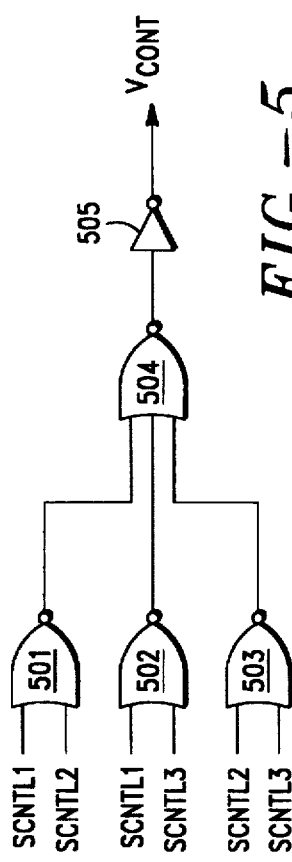
FIG. 5 shows the logic that is used in the currently preferred embodiment of the present invention to decode the three commutation signals in generating the control signal.

FIG. 5 shows the logic that is used in the currently preferred embodiment of the present invention to decode the three commutation signals in generating the control signal $V_{CONT}$. Three two-input NOR gates 501-503 are used to accept the commutation signals. Specifically, the first commutation signal SCNTL1 and the second commutation signal SCNTL2 are input to NOR gate 501; the first commutation signal SCNTL1 and the third commutation signal SCNTL3 are input to NOR gate 502; and the second commutation signal SCNTL2 and the third commutation signal SCNTL3 are input to NOR gate 503. All three outputs from NOR gates 501-503 are input to NOR gate 504. The output signal from NOR gate 504 is then inverted by inverter 505. The output signal from inverter 505 becomes the control signal $V_{CONT}$.

I claim:

1. A magnetic storage device comprising:

a rotatable disk for storing data;

a transducer for writing data onto the rotatable disk;

a spindle motor for rotating the disk, wherein the spindle motor has a plurality of windings;

a comparator coupled to one of the windings for detecting a zero crossing corresponding to when a voltage corresponding to one of the windings equals a reference voltage;

a control circuit coupled to the comparator for generating a control signal that indicates a slope of the voltage corresponding to one of the windings, wherein the determination is based on commutation signals that provide sequencing for the spindle motor;

a hysteresis circuit coupled to the control circuit for providing a hysteresis voltage to an input of the comparator according to the control signal, wherein after the zero-crossing is detected:

a positive hysteresis voltage is provided to the input of the comparator if the control signal indicates that the voltage corresponding to one of the windings has a positive slope; and a negative hysteresis voltage is provided to the input of the comparator if the control signal indicates that the voltage corresponding to one of the windings has a negative slope.

2. The magnetic storage device of claim 1 further comprising control signal logic comprised of a plurality of NOR gates for generating the control signal, wherein the control signal is generated by inputting a first commutation signal and a second commutation signal to a first NOR gate, inputting the second commutation signals and a third commutation signal to a second NOR gate, inputting the first commutation signal and the third commutation signal to a third NOR gate, and performing an OR function on all three signals corresponding to the first, second, and third NOR gates.

3. The magnetic storage device of claim 2 further comprising:

a resistor coupled to one of the inputs of the comparator;

a first current source for providing a first current;

a first transistor coupled to the control signal logic and to the first current source, wherein the first transistor causes the first current to flow through the resistor in a first direction when the control signal is at a first voltage level which provides the positive hysteresis voltage;

a second current source for providing a second current;

a second transistor coupled to the control signal logic and to the second current source, wherein the second transistor causes the second current to flow through the resistor in an opposite direction when the control signal is at a second voltage level which provides the negative hysteresis voltage.

4. The magnetic storage device of claim 3 further comprising:

a third transistor coupled to the first transistor that disables the first transistor when an output signal from the comparator switches from a low state to a high state;

a fourth transistor coupled to the second transistor that disables the second transistor when the output signal from the comparator switches from the high state to the low state.

5. The magnetic storage device of claim 1, wherein the motor is comprised of three windings, each of which has a corresponding comparator and hysteresis circuit for providing hysteresis voltage to that comparator.

6. The magnetic storage device of claim 5, wherein the hysteresis voltage is in a range of 10 to 50 millivolts.

7. A hard disk drive comprising:

a rigid disk for storing digital data;

a transducer for writing the digital data onto the disk;

a spindle motor for spinning the rigid disk, wherein the spindle motor is comprised of a plurality of windings coupled to a center-tap;

a comparator having one input coupled to one of the windings and another input coupled to the center-tap, wherein an output signal from the comparator an occurrence of a zero-crossing corresponding to when a back emf signal corresponding to the winding equals a center-tap voltage;

a control circuit coupled to the comparator for generating a control signal that indicate a slope of the voltage corresponding to one of the windings, wherein the determination is based on commutation signals that provide sequencing for the spindle motor;

a hysteresis circuit coupled to the comparator for providing hysteresis to an input to the comparator only after a zero-crossing has been detected, wherein the hysteresis circuit is comprised of a first transistor coupled to an output of the comparator for determining when the hysteresis circuit is to provide a positive hysteresis voltage to the comparator according to the control signal and a second transistor coupled to the output of the comparator for enabling the hysteresis circuit to provide a negative hysteresis voltage to the comparator according to the control signal.

8. The hard disk drive of claim 7 further comprising:

a commutation circuit coupled to the windings for controlling how current is to be driven through the windings;

control logic coupled to the commutation circuit for generating the control signal, wherein the control signal corresponds to the slope of the back emf signal and the control signal determines whether the positive hysteresis voltage or the negative hysteresis voltage is to be applied to the comparator.

9. The hard disk drive of claim 8, wherein the control logic is comprised of:

a first NOR gate for accepting a first commutation signal and a second commutation signal;

a second NOR gate for accepting the first commutation signal and a third commutation signal;

a third NOR gate for accepting the second commutation signal and the third commutation signal;

a fourth NOR gate coupled to the first NOR gate, the second NOR gate, and the third NOR gate and accepting the outputs of the first NOR gate, the second NOR gate, and the third NOR gate;

an inverter coupled to the output of the fourth NOR gate, wherein the inverter output is the control signal.

10. The hard disk drive of claim 8, wherein the hysteresis circuit is further comprised of:

a resistor coupled to an input of the comparator;

a first current source coupled to the resistor for providing current that flows in one direction through the resistor which produces the positive hysteresis voltage;

a second current source coupled to the resistor for providing current that flows in an opposite direction through the resistor which produces the negative hysteresis voltage.

11. The hard disk drive of claim 10, wherein the hysteresis circuit is further comprised of:

a third transistor coupled to the control logic, wherein the third transistor enables the first current source to provide current to flow through the resistor;

a fourth transistor coupled to the control logic, wherein the fourth transistor enables the second current source to provide current to flow through the resistor in the opposite direction.

12. The hard disk drive of claim 7, wherein each of the plurality of windings has a corresponding comparator and hysteresis circuit.

13. In a hard disk drive having a disk for storing digital data, a transducer for writing the digital data onto the disk, and a spindle motor for rotating the disk about a spindle, a method for providing hysteresis voltage to a comparator that detects zero-crossings, the method comprising the steps of:

detecting a zero crossing by comparing a winding voltage to a center-tap voltage, wherein if the zero crossing occurs when the winding voltage equals the center-tap voltage;

switching a state of an output signal generated by the comparator when the zero crossing is detected;

applying the hysteresis voltage to an input of the comparator when the output signal generated by the comparator switches states, wherein the hysteresis voltage is applied only after the zero crossing has been detected;

generating a control signal as a function of commutation signals used to drive the spindle motor, wherein the control signal indicates a slope of a signal associated with a winding of the motor;

applying a positive hysteresis voltage to the input of the comparator when the slope is negative; and applying a negative hysteresis voltage to the input of the comparator when the slope is positive.

14. The method of claim 13, wherein determining step of determining the slope is performed according to a function of a plurality of commutation signals used to commutate the motor.

15. The method of claim 13 further comprising the steps of:

generating the positive hysteresis voltage by sourcing current to flow into a resistor coupled to an input of the comparator;

generating the negative hysteresis voltage by sinking current to flow from the resistor that is coupled to the input of the comparator.

* * * * *